United States Patent [19]
Zafred

[11] Patent Number: 4,584,452
[45] Date of Patent: Apr. 22, 1986

[54] REMOTELY ACTUATED METAL DISINTEGRATION MACHINING APPARATUS

[75] Inventor: Paolo R. Zafred, Pittsburgh, Pa.

[73] Assignee: Westinghouse Electric Corp., Pittsburgh, Pa.

[21] Appl. No.: 548,549

[22] Filed: Nov. 3, 1983

[51] Int. Cl.$^4$ .......................... B23H 7/30; B23K 9/28
[52] U.S. Cl. ................................ 219/69 V; 204/129.7
[58] Field of Search .............. 219/69 V, 70, 68, 69 R; 248/51; 91/39; 204/129.7; 51/595 S

[56] References Cited

U.S. PATENT DOCUMENTS

| | | | |
|---|---|---|---|
| 1,965,867 | 7/1934 | Vickers | 91/39 |
| 2,058,553 | 10/1936 | Beiderman | 91/39 |
| 2,803,226 | 8/1957 | Renoux | 91/39 |
| 2,942,092 | 6/1960 | Cammann | 219/69 V |
| 2,980,076 | 4/1961 | Machlan | 91/39 |
| 3,047,707 | 7/1962 | De Bruyn | 219/69 V |
| 3,084,817 | 4/1963 | Lovrenich | 91/39 |
| 3,587,394 | 6/1971 | Hilbrands | 91/39 |
| 3,610,877 | 10/1971 | Driscoll | 219/68 |
| 4,259,562 | 3/1981 | Cammann et al. | 219/69 V |
| 4,308,924 | 1/1981 | Boguth | 91/39 |
| 4,360,302 | 11/1982 | Askov et al. | 248/51 |
| 4,476,368 | 10/1984 | Cammann et al. | 219/69 V |
| 4,481,451 | 11/1984 | Kautz | 91/39 |

FOREIGN PATENT DOCUMENTS

138532  8/1982  Japan ................. 219/69 C

*Primary Examiner*—C. L. Albritton
*Assistant Examiner*—Geoffrey S. Evans
*Attorney, Agent, or Firm*—L. A. DePaul

[57] ABSTRACT

A metal disintegration apparatus for performing work on a portion of a workpiece in a confined location which includes an electrode, and an electrode holder for movably holding, positioning and supporting the electrode at a desired remote location. A vibration feeder is coupled to the electrode so that the electrode can be vibrated relative to the electrode holder while the electrode holder is stationary and the electrode can be advanced to perform cutting. Preferably an air-cushioned reciprocating piston type pneumatic oscillator sends vibrations through a frictionless actuator cable supported by an articulated arm to vibrate the electrode. The vibration feeder is located in a position remote to that of the electrode and therefore the metal disintegration apparatus is ideally suited for work at remote locations such as those encountered in steam generators of nuclear reactors.

33 Claims, 13 Drawing Figures

REMOTELY ACTUATED METAL DISINTEGRATION MACHINING APPARATUS

BACKGROUND OF THE INVENTION

1. Field of the Invention

The present invention relates to metal disintegration apparatus, and more particularly to a metal disintegration apparatus which can perform the desired cutting task on a workpiece at a remote and relatively obstructed location.

2. Description of the Prior Art

The present invention relates to apparatus for cutting unmachinable metals and alloys and metal heat treated to an unmachinable condition and is particularly concerned with the difficult task of slotting plates in tube heat exchangers for steam generators used in conjunction with nuclear reactors.

In tube type heat exchangers designed with a preheat section, a first fluid flows through the tubes of the heat exchanger while a second fluid enters through a pre-heater section consisting of baffles on the cold leg of the tube bundle such that the heat exchange occurs more effectively between the two fluids. Occasionally, due to flow induced tube vibrations, some tubes may experience rapid wear at the baffle plate junctures such that if a leak occurs therein the fluids are allowed to mingle. When such a situation occurs, plugging the damaged tubes and continuing with plant operation is not acceptable as loose parts can be generated. Therefore, a long term corrective action must be implemented in order to prevent inevitable operational limitations which are likely to have serious economic repercussions.

Although there are several methods known in the art for repairing heat exchanger tubes affected by vibrational problems, many of these methods are not applicable to repair of heat exchanger tubes where the tube is not easily accessible. For instance, if drills are utilized, a thrust of force must be applied against the tube plate. This is a problem in view of the fact that the plates are often located at inaccessible positions within the steam generators. The use of flame operations such as in welding or cutting torches is not allowed in a nuclear environment because it would create air-borne contamination by radioactive particles.

Because of these difficulties, special methods have been developed for repairing heat exchanger tubes in nuclear steam generators. Typically, the repair method involves internal modification of the pre-heat section via the main feed water nozzle. Since most of the modifications to be done are at a location where access is very tight and the area is radioactive, exposure time for repair work is limited. An additional problem consists of the physical size and material combination of the actual internal structure which has to be removed or machined prior to installation of a new flow distribution device.

The present invention teaches an apparatus for machining rectangular slots in the plates enclosing the upper part of the water chambers of steam generators adjacent to the feed water inlet thereof, thus providing a flow bypass from the preheat section. As a result, feed water velocity is diminished in the preheat section and the flow is distributed in an orderly pattern. The present invention accomplishes this by providing an advanced electro-machining technique for removal of the slot material.

Generally, electro-metal disintegration machining has been used in machine shops wherein electrodes for a metal disintegration machine are formed in a desired shape to create the desired opening. Devices of this character are shown in U.S. Pat. Nos. 3,518,196 to Bonga, 3,806,691 to Roach, 3,833,785 to Roach, 4,203,018 to Schnieder, 4,215,261 to Brifford, 4,230,926 to Gaumond, and 4,243,836.

Additionally, U.S. Pat. No. 4,259,562 to Cammann teaches a portable disintegrator which has a small degree of reach so that metal disintegration can be accomplished at a location spaced from the vibrator thereof. In two embodiments an extended shaft is provided including a support, the entire shaft and support being vibrated by a vibrator. In another embodiment a rigid conduit is provided between the electrode of the metal disintegrator and the vibrator thereof, the motion of the vibrator being transferred to the electrode by a flexible push-pull cable. As for the embodiment wherein the entire shaft and support vibrates, this is extremely inconvenient and largely impractical for use at remote locations. As for the embodiment which includes a rigid conduit in which a flexible cable is reciprocated, because of the configuration of the conduit and cable and the driving thereof by a solenoid type vibrator, only relatively small displacements of electrodes relative to the vibrator can be effected.

Further, the device suffers from the disadvantages of a conventional push-pull cable in that it works well in tension but not particularly well in compression. In a metal disintegration machine when a vibratory motion and an advancing motion is transferred to an electrode over a remote distance, such as five feet or larger, the cable employed needs to work well both in compression and tension for movement of the electrode.

The present invention overcomes the shortcomings of the prior art by providing a metal disintegration apparatus which in one embodiment provides an electrode supported by a movable arm and which is driven by an actuator cable means such that once the arm is articulated into position only the cable, and thus the electrode, is moved. Another embodiment of the present invention provides a rigid conduit between the vibration means and the electrode means thereof, the vibration means driving the electrode means by virtue of a special moving element assembly capable of working over distances much greater than a conventional push-pull cable.

SUMMARY OF THE INVENTION

Therefore, a primary object of the present invention is to provide a metal disintegration maching apparatus which can be remotely actuated and controlled.

A further object of the present invention is to provide a metal disintegration apparatus which can be remotely controlled over relatively large distances.

A still further object of the present invention is to provide a metal disintegration apparatus which is ideally suited for operation in confined areas.

Still another object of the present invention is to provide a metal disintegration apparatus which is configured to conviently act upon workpieces that are in relatively inaccessible locations.

Another further object of the present invention is to provide a metal disintegration apparatus which vibrates only the electrode thereof and not the supporting means therefore.

An additional object of the present invention is to provide a metal disintegration apparatus which is ideally suited for slotting of plates in nuclear tube type heat exchangers.

Still an additional object of the present invention is to provide a metal disintegration apparatus which is relatively simple in design, relatively inexpensive to manufacture, rugged in construction, easy to use, and efficient in operation.

These objects as well as further objects and advantages of the present invention will become readily apparent after reading the ensuing description of non-limiting illustrative embodiments and viewing the accompanying drawings.

A metal disintegration apparatus for performing work on a portion of a workpiece in a confined location, according to the principles of the present invention in one embodiment, comprises electrode means; electrode holder means for movably holding the electrode means; positioning and supporting means secured on one end thereof to the electrode holder means, the supporting and positioning means being movable for positioning the electrode holder means in a selectable position and for supporting the electrode holder therein, the other end of the positioning and supporting means being secured to a supporting surface; vibration feed means having a mechanical output for vibrating at selected frequencies and for advancing selected distances, the vibration feed means being positioned remote to the electrode means; and actuator cable means for coupling the mechanical output to the electrode means, the actuator cable means being secured on one end thereof to the electrode means, the other end of the actuator cable means being connected to the mechanical output of the vibration feed means.

A metal disintegration apparatus for performing work on a portion of a workpiece in a confined location, according to the principles of the present invention in another embodiment, comprises electrode means; electrode holder means for movably holding the electrode means; positioning and supporting means secured on one end thereof to the electrode holder means, the supporting and positioning means including a rigid conduit for positioning the electrode in a preselected position relative to a supporting surface, the other end of the positioning and supporting means being secured to the supporting surface; vibration feed means having a mechanical output for vibrating at selected frequencies and for advancing selected distances, the vibration feed means being positioned remote to the electrode means; and actuator cable means for coupling the mechanical output to the electrode means, the actuator cable means being disposed through the rigid conduit, the actuator cable means being secured on one end thereof to the electrode means, the other end of the actuator cable means being connected to the mechanical output of the vibration feed means, the actuator cable means being a moving element assembly including a plurality of adjacent spherical shells disposed within the rigid conduit, and a cable on which these spherical shells are strung.

BRIEF DESCRIPTION OF THE DRAWINGS

In order that the present invention may be fully understood it will now be described, by way of example, with reference to the accompanying drawing in which.

DESCRIPTION OF THE PREFERRED EMBODIMENTS

The present invention, as will hereinafter be described, is an apparatus for cutting unmachinable metal alloys and metal heat treated to an unmachinable condition which are disposed at locations that are obstructed and/or are remote to the operator's position. Although the invention may well be employed for other applications, it will be described herein primarily in conjunction with the process of slotting of plates in tube type heat exchangers of steam generators used in conjunction with nuclear reactors.

In tube type heat exchangers having a preheat section, one fluid flows through the tubes of the heat exchanger while a second fluid enters through a preheater section consisting of baffles on the cold leg of the tube bundle so that heat exchange occurs more effectively between the two fluids. Occasionally, due to flow induced tube vibrations, some tubes may experience rapid wear at the baffle plate junctures leading to leaks which allow the fluids to mingle. When this condition arises, it is desirable to machine rectangular slots in the plate enclosing the upper part of the water chamber adjacent to the feed water inlet of the steam generator to provide a flow bypass from the preheat section. As a result, feed water velocity is diminished in the preheat section and the flow is distributed in an orderly fashion. This slot is removed by a metal disintegration or electromachining technique wherein a vibrating and advancing electrode is used in conjunction with water and high pressure air as a coolant for the electrode. The apparatus to be described permits control and monitoring from a point remote relative to the electrode and therefore permits electromachining in situations having difficult geometric restrictions.

Figure 1:
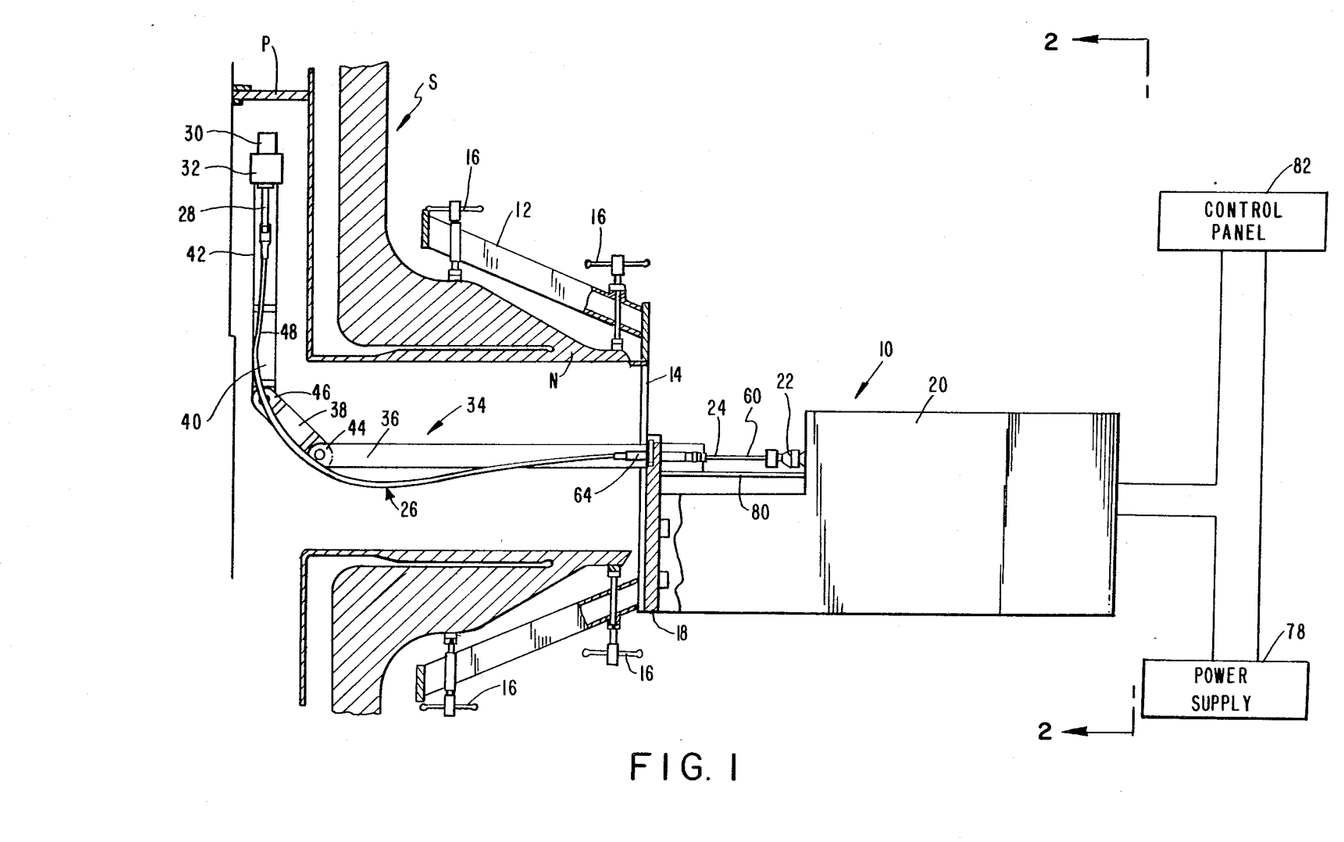
FIG. 1 is a pictorial representation of one embodiment of the present invention mounted on the nozzle of a steam generator for accomplishing overhead slotting therein.
Figure 2:
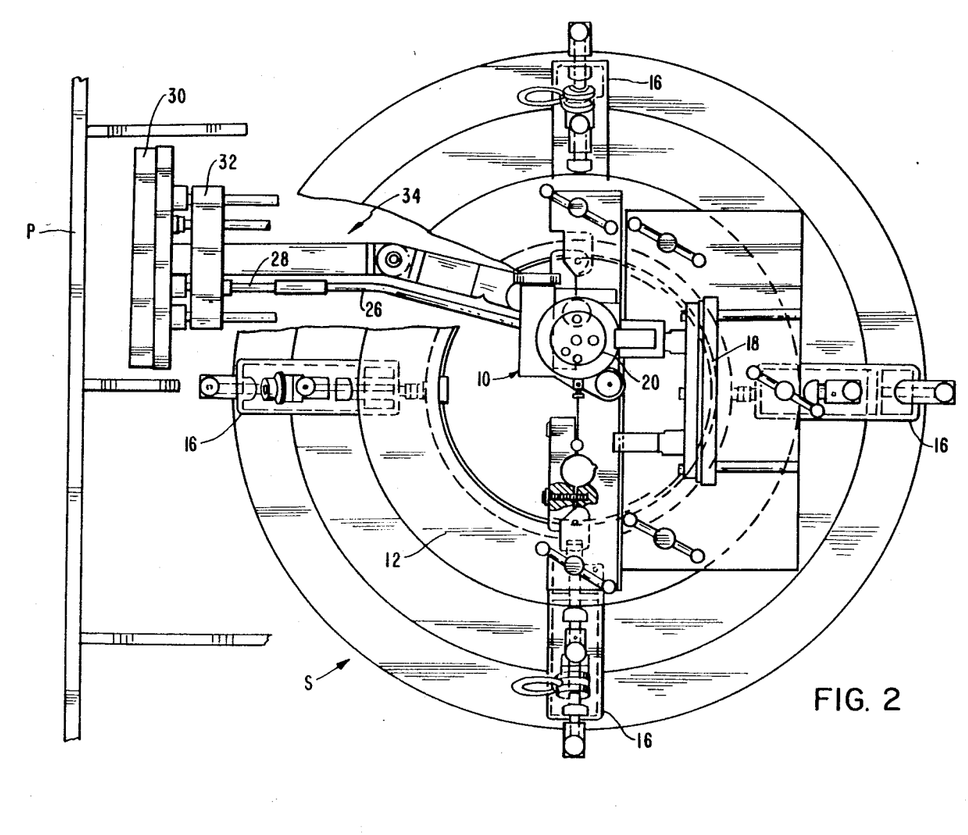
FIG. 2 is a front view of the embodiment of FIG. 1 taken from the lines 2—2 of FIG. 1.

Referring now to the figures, and more particularly to FIGS. 1 and 2 thereof, there is illustrated therein a metal disintegration apparatus 10 installed for use on a nozzle end of a steam generator having internally a plate P in which it is desired to cut a slot for the aforedescribed purpose. Although the subject invention will be described for use in conjunction with cutting a slot in plate P, it is to be understood that it can be also employed in other environments wherein it is necessary to effect cutting in a relatively inaccessible and obstructed location such as plate P. A feature of the present invention is that the distance between the control mechanism and electrode, which will be hereinafter described, can be in excess of fifty feet, a distance heretofore not achieved.

The mounting for the metal disintegration apparatus 10 is in the form of a nozzle adaptor 12 which provides a mounting plate 14. The nozzle adapter 12 is secured to the nozzle end by a plurality of conventional threaded clamps 16 which position the nozzle adaptor 12 in a fixed location, as illustrated. Of course, it is to be understood that the reason for the use of the nozzle adaptor 12 is because of the typical configuration of the nozzle end and, alternate securing means could be employed if a nozzle was not present and if other structure to which a mounting plate could be affixed was present. Affixed to the mounting plate 14 by a bracket 18 is a vibration feed assembly 20, which will be hereinafter further described in conjunction with FIG. 4. The vibration feed assembly 20 has an output head 22 which can be vibrated and advanced as described. Mounted to the output head 22 is a first end 24 of a control cable 26. The second end 28 of the control cable 26 is operably connected to an electrode 30 carrried by an electrode holder 32. The relationship between the electrode 30 and the electrode holder 32 will be hereinafter further discussed in conjunction with FIGS. 5 and 6.

The electrode holder 32 and therefore the electrode 30 is held in a desired position and is supported therein by an articulated arm 34 including arm segments 36, 38, 40 and 42. The arm segments 36 and 38 are joined by a pivotal joint 44, the arm segments 38 and 40 are joined by a pivotal joint 46 and the arm segments 40 and 42 are joined by a pivotal joint 48.

Figures 3, 6:
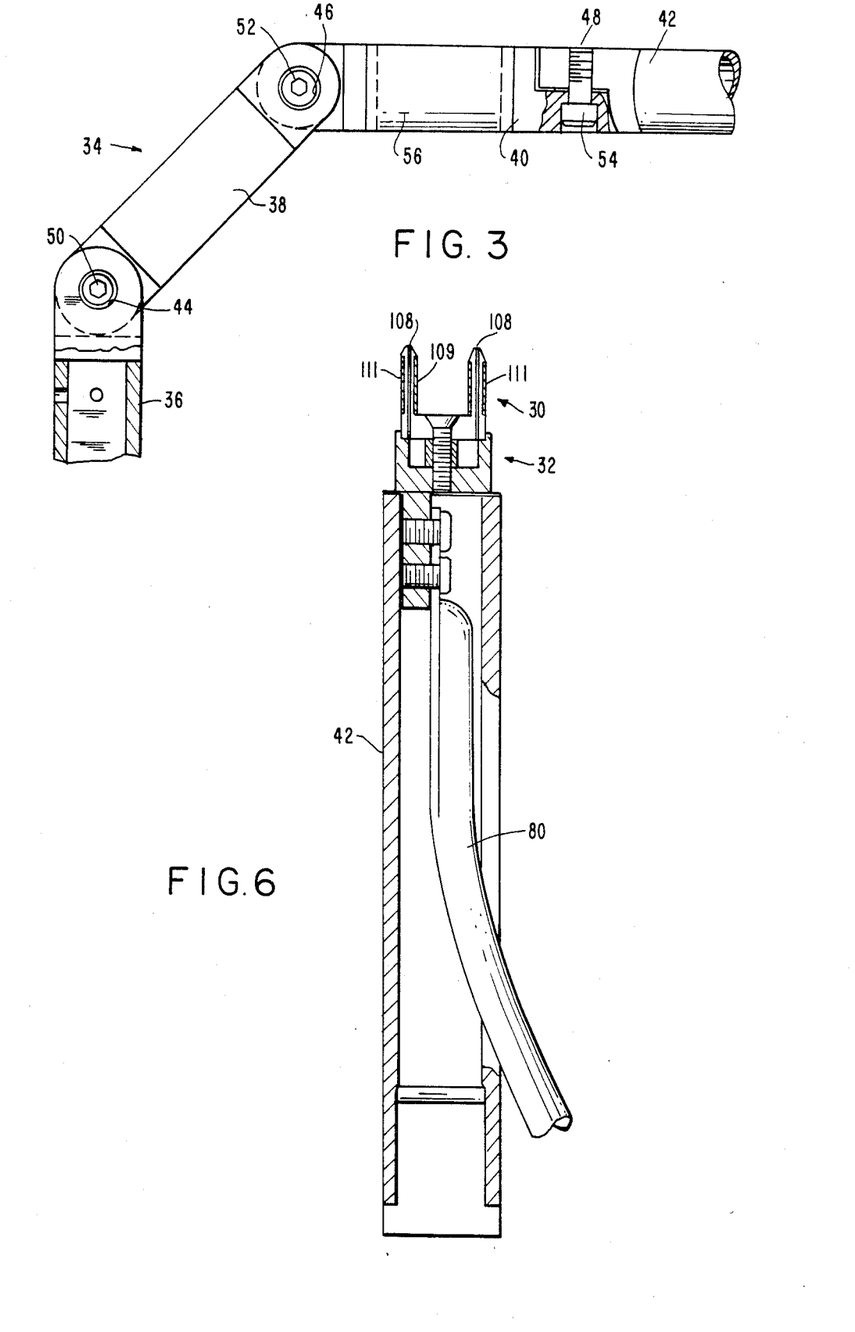
FIG. 3 is an enlarged fragmentary partially broken away detail of the articulated joints of the arm of the embodiment in FIGS. 1 and 2.
FIG. 6 is a cross-sectional view taken substantially along the line 6—6 of FIG. 5.

With specific reference to FIG. 3, the nature of the pivotal joints 44, 46, and 48, which join together the arm segments 36 through 42 of the articulated arm 34, can be appreciated. Each of the pivotal joints 44, 46, and 48 pivot on an axis formed, respectively, by pins 50, 52, and 54 which are fixed in position in a conventional manner. In addition, the pivotal joints 44, 46, and 48 include ball bearing detents, not illustrated, to lock the joints in position as desired, thereby locking the arm segments 36 through 42 in a selected configuration.

In addition to the arm segments being pivotal at the pivotal joints 44, 46, and 48 they incorporate tube sleeves such as tube sleeve 56 which joins portions of the segment 40 together and which permits rotation through 360°. Basically, the tube sleeve is configured so that it can capture and retain two portions of an arm segment and permit rotation therein of the portions of the arm segments about a common central axis.

Although one particular configuration of articulated arm has been disclosed herein it is to be understood that those skilled in the art within the principles and scope of the invention could configure other arms of different designs so long as the essential characteristics of adjustability and stability after adjustment are present. Additionally, a robotic type arm of conventional design could also be employed.

Figure 5:
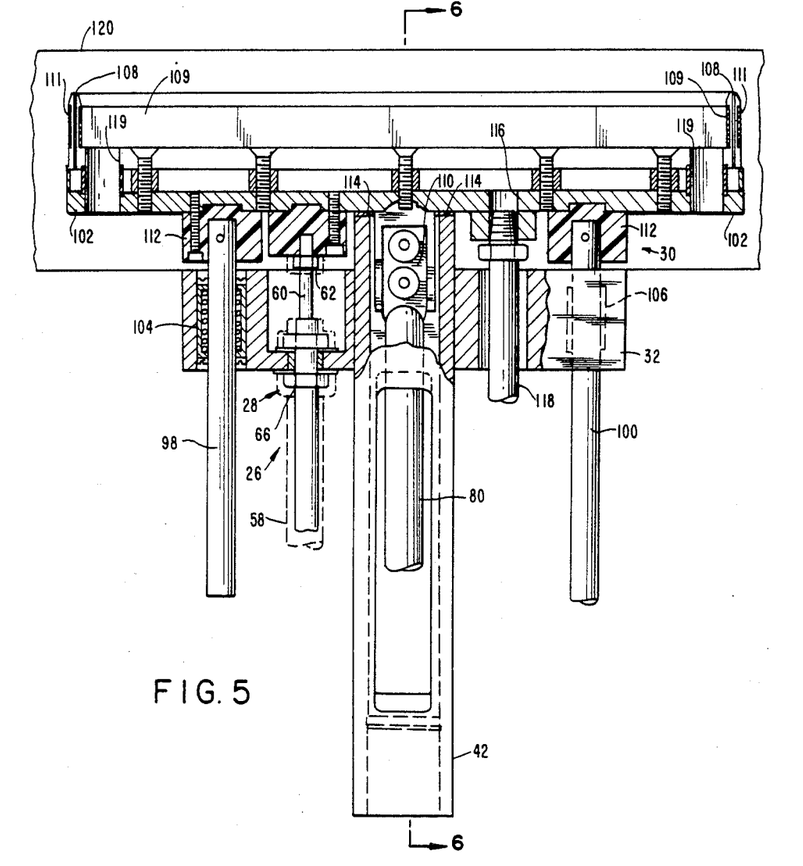
FIG. 5 is an enlarged view in cross-section of the electrode and electrode holder of the present invention.
Figure 7:
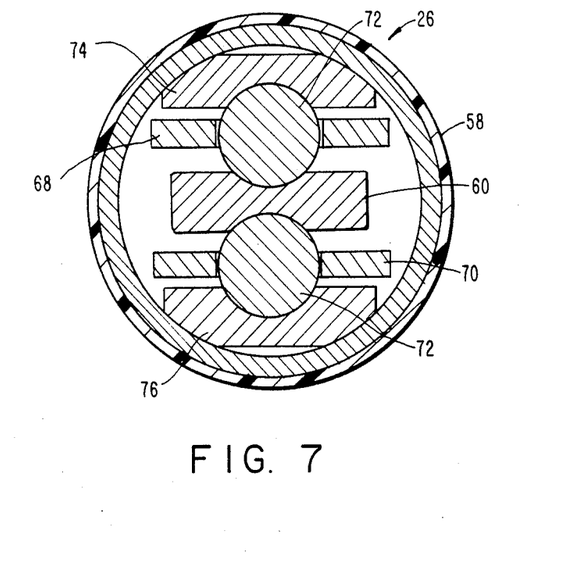
FIG. 7 is an enlarged cross-sectional view of one embodiment of the actuator cable of the present invention.
Figure 8:
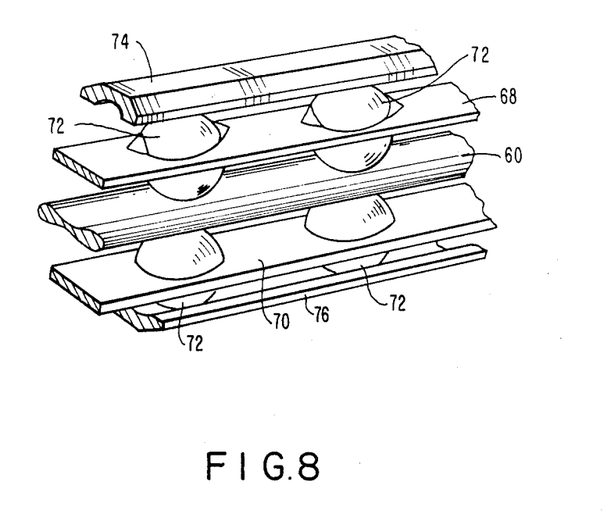
FIG. 8 is a fragmentary enlarged view of the actuator cable of FIG. 7.

Returning to FIGS. 1 and 2, and with simultaneous reference to FIGS. 7 and 8, the cable 26 is seen to include a flexible sheath 58 and a central movable control bar 60. The control bar 60 is secured adjacent to the end 24 of the cable 26 to the output head 22 of the vibration feed assembly 20 and the other end of the flexible bar 60 is secured to the electrode 30 by a clamp 62 as shown in FIG. 5. The outer sheath 58 of the cable 26 is fixedly secured on one end to the plate 14 by a coupling 64 and on the other end to the electrode holder 32 by a coupling 66. As a result, the ends of the sheath 58 are fixed relative to the flexible bar 60 of the control cable 26.

Also within the sheath 58 are a pair of ball bearing trains 68 and 70, each comprising a ball guide having a plurality of apertures disposed therethrough, each of the apertures for capturing and rotatably retaining therein ball bearings 72. Lastly, also disposed within the flexible sheath 58 are outer reaction elements 74 and 76 which are fixed in position relative to the sheath 58 and which are also flexible. As a result, the ball bearing train 68 rides between the outer reaction element 74 and the flexible bar 60 and the ball bearing train 70 rides between the outer reaction element 76 and the flexible bar 60. The result is a construction wherein the flexible bar 60 can move freely with little friction within the cable sheath 58 regardless of the configuration the control cable 26 assumes as the arm 34 is articulated. Control cable 26 is of a commercially available design and is marketed both by the Teleflex Corporation and by the Controlex Corportion of America.

Employment of the control cable as disclosed provides a distinct advantage over prior art metal disintegration apparatuses which use a bare cable within a flexible sheath. Such cables work well in tension but not in compression and, as noted above, in a metal disintegration machine the means for driving the electrode must work well both in compression and tension or the electrode will not move properly. Further, such push-pull cables which employ a bare cable wire cannot transmit vibrations of the necessary frequencies over sufficiently long distances, such as over five feet, to be employed for application such as hereinbefore described. In particular, the configuration herein disclosed which employs a control cable 26 has worked distances of in excess of fifty feet, such being entirely impossible with the use of presently employed cables.

An alternate embodiment for a suitable frictionless cable is illustrated and will be described in conjunction with FIG. 10.

Through the employment of the control cable 26 in conjunction with the articulated arm 34, a structure is provided wherein the arm 34 maintains the electrode holder 32 in a position uneffected by movement transmitted by the control cable 26. Where the present invention is employed in confined spaces, this is extremely desirable.

The vibration feed assembly 20 is powered by a power supply 78. The power supply 78 also has one pole thereof electrically connected to the plate P to be disintegrated and the other pole thereof to the electrode 30. Although this may be accomplished in many ways, an electrical cable 80 partially obstructed by arm 34, is employed as illustrated in FIG. 1. The functions of the power supply 78 and the vibration feed assembly 20 are controlled by a control panel 82. Control panel 82 includes means for powering the electrode 30 and the vibration feed apparatus 20 and it also can incorporate numerous indicator instruments, a feed pressure control, a feed balance control, and an electrode sensitivity control, all of conventional design and known in the electro-disintegration art.

Figure 4:
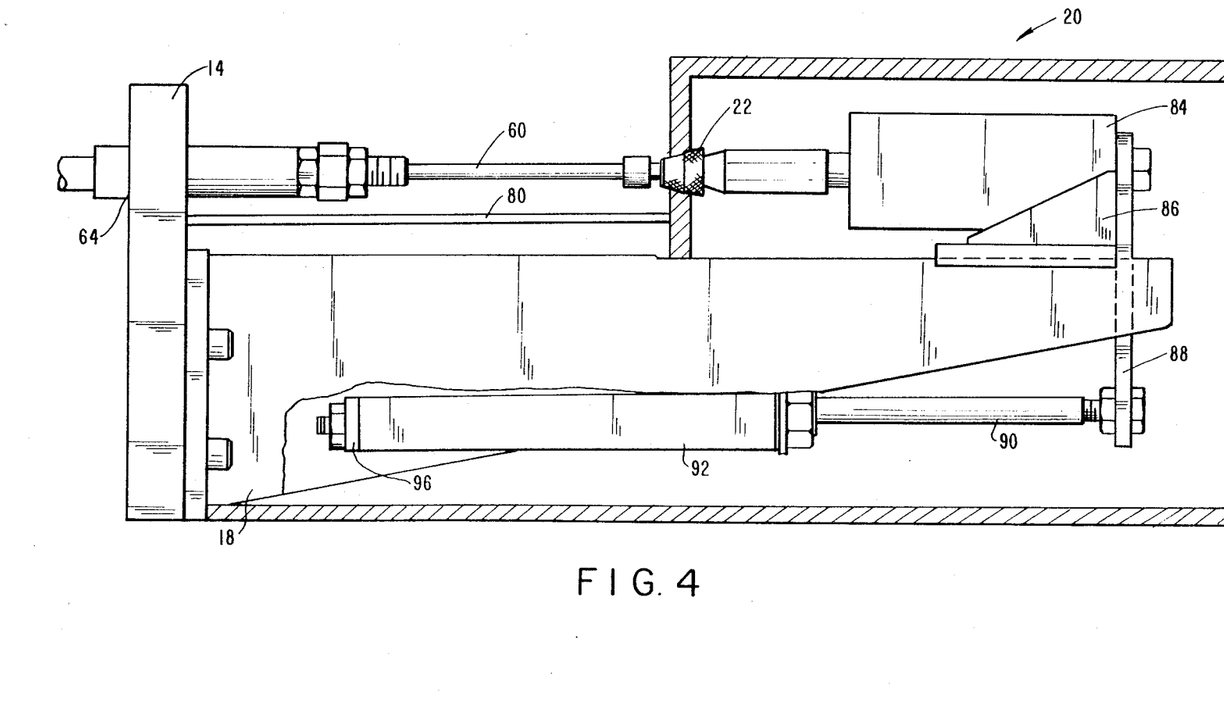
FIG. 4 is an enlarged partially broken away side view of the vibration feed means of the present invention.

Referring to FIG. 4, the vibration feed assembly 20 is illustrated therein with the cover thereof broken away. The bracket 18, fixedly secured to the mounting plate 14, serves as a support for a pneumatic vibration oscillator 84. The pneumatic vibration oscillator 84 is secured to a bracket 86 which slidably engages the bracket 18 so that the pneumatic vibrator oscillator 84 can be moved therealong. A plate 88 joins the bracket 86 to a shaft 90 of a pneumatic air cylinder 92. The pneumatic air cylinder has its casing fixedly secured at an end 94 thereof to a flange 9 which is fixedly secured to the bracket 18. As a result of this mounting arrangement, as the pneumatic air cylinder 92 is extended and retracted the pneumatic vibration oscillator 84 slides along the bracket 18 and causes pushing or pulling of the flexible bar 60 engaged by the output head 22. This permits advancing of the flexible bar 60 and retraction thereof depending upon the direction in which the pneumatic air cylinder 92 is activated. Simultaneously, the pneumatic vibration oscillator 84 induces a vibration in the flexible bar 60.

The pneumatic air cylinder 92 is controlled by conventional means well known in the pneumatic arts. The pneumatic vibration oscillator 84 is capable of displacements adjustable between the range of 0.030 and 0.090 inches and can be operated at a frequency of 40 to 60 Hz. One brand of pneumatic vibrator capable of meeting these criteria is a Martin pneumatic vibrator oscillator known as the MTK 15X Oscillator. Of course, it is understood that other oscillators may be employed but the employment of a pneumatic type oscillator is important since, in conventional metal disintegrations apparatuses, solenoid type vibrators are employed and such are totally unsuitable for the subject application. More specifically, the applicant has discovered that solenoid type vibrators do not provide enough power to vibrate remotely located electrodes configured as in the present invention, which are relatively heavy compared to that of conventional electrodes that are disposed adjacent to a vibrator. This is because a vibrating heavy mass requires a solenoid of considerable size and the larger the solenoid, the slower the resulting response time. This ultimately affects the metal disintegration process in a negative manner. The stroke length which is ultimately selected for the vibration feed assembly 20 is dependent on the size of the electrode, and the operational frequencies are dependent upon the power from the employed electrical network such as for example, 60 Hz. The stroke length is selected depending upon the nature of the finish that the user wants for the cut surface.

The advancing and vibration provided by the vibration feed assembly 20 is transferred through the control cable 26 to the electrode 30 as shown in FIGS. 5 and 6. The electrode 30 is mounted to the electrode holder 32 by a pair of guide rods 98 and 100 each secured to the base portion 102 of the electrode 30. The guide rods 98 and 100 are slidably disposed, respectively, within tubular bushings 104 and 106 mounted in the electrode holder 32. As a result, the electrode 32 can be freely reciprocated, advanced, and retracted relative to the electrode holder 32 by the control cable 26. The flexible bar 60 is fixedly secured to the electrode 30 by a clamp 62 as previously noted.

Figure 5A:
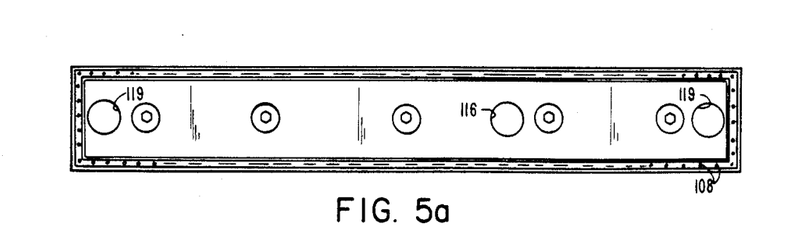
FIG. 5a is an end view of the electrode of FIG. 5.

The electrode 30 is of the slotting type and has the working surface 108 thereof configured in a rectangle as is shown in FIG. 5a. The inner and outer side surfaces of the electrode 30 are insulated, respectively, by insulators 109 and 111, to preclude secondary arcs. The electrode 30 is constructed of a very fine grain graphite and is electrically connected to the power supply 78 by the cable 80 terminating in a connector 110. As the electrode 30 reciprocates and is advanced it is unrestricted by the cable 80 which has a sufficient degree of slack to permit such movement. The electrode 30 is electrically insulated from the electrode holder 32 by insulator blocks 112 fixedly secured to the base portion 102 of the electrode 30 and also to the guide rods 98 and 100. Insulators 114 are also provided to electrically shield the base portion 102 of the electrode 30 from coming into contact with the articulated arm 42.

An aperture 116 is disposed through the base portion 102 of the electrode 30 and has coupled thereto a hose 118 to supply air and water to the electrode and the workpiece. Other similar apertures 119 and hoses, not illustrated, can be provided for water removal or for other purposes as needed. A bellows type cup 120 encloses the electrode 30 and serves to confine the air and water and to collect debris between the portion of the workpiece to which cutting effected and the electrode. Bellows 120 is preferably constructed of neoprene or the like.

The pneumatic vibration oscillator 84, when coupled with the described control cable 26, is a highly efficient and accurate source of vibration with efficiencies approaching 95 percent regardless of the control cable length, the load on the control cable, or the configuration thereof. It has been demonstrated that the ball bearing actuator provides reliable vibration control from 5 to 2,000 Hz at 15 g's maximum.

In operation, the mounting plate 14 or other mounting structure would be fixedly secured to the nozzle adaptor 12 after the articulated arm 34 was articulated into the desired configuration. The pneumatic air cylinder 92 and the pneumatic vibration oscillator 84 would be adjusted to provide the desired frequency of vibration and degree of feed. The workpiece would then be connected to one pole of the power supply, the other pole or power supply being connected to the electrode 30. The electrode 30 would be vibrated vis-a-vis the control cable 26 at the desired frequency with water and air being supplied through the tube 100 to the workpiece being cut. When the desired cutting is effected the apparatus 10 would be shut down and removed.

Thus it can be seen that a relatively simple apparatus is described herein which accomplishes the desired remote metal disintegration with relative ease. In fact, once the operational parameters are selected, the device can proceed to effect metal disintegration without supervision.

It is to be understood that, although the subject invention is described herein as employing a slotted type electrode, it is readily adaptable by those of ordinary skill in the art to electrodes of other configurations. For instance, a round hollow electrode could be employed for underwater nuclear reactor pressure vessel fastener removal.

Figures 9, 10:
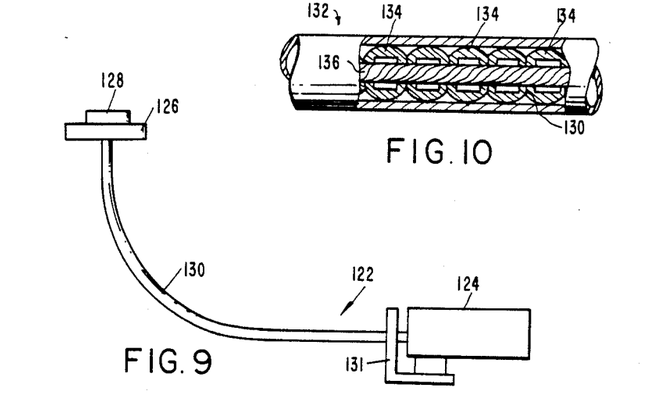
FIG. 9 is a pictorial representation of an alternate embodiment of the present invention.
FIG. 10 is an enlarged fragmentary partially broken way view of the actuator cable employed in the embodiment of FIG. 9.

An alternate embodiment of a metal disintegration apparatus 122 in accordance with the present invention is illustrated in FIG. 9. Metal disintegration apparatus 122 includes a vibration feed assembly 124, and electrode holder 126 and an electrode 128. The vibration feed assembly 124, the electrode holder 126, and the electrode 128 function as their counterparts in FIG. 1, the difference between the metal disintegration apparatus 10 and the metal disintegration apparatus 122 being in the manner in which the electrode holder 126 is supported and the manner in which the electrode 128 is reciprocated and fed. Instead of the articulated arm 34 and the control cable 26, a rigid conduit 130, as further illustrated in FIG. 10, is employed. The rigid conduit 30 positions the electrode holder 126 in a fixed location relative to a supporting plate 130 which itself is secured to a desired supporting surface. Force is transferred from the mechanical output of the vibration feed assembly 124 to the electrode 128 via a moving element assembly 132, further illustrated in FIG. 10. The moving element assembly 132 comprises a plurality of spherical shells 134 disposed adjacent to each other and all being strung on a flexible cable 136. Such cables employing moving element assemblies are known and, for instance, are available from the Southwest Products Co. of California, but have heretofore not been employed as disclosed herein for remote metal disintegration apparatus. The spherical shells serve to reduce friction between the rigid conduit 130 and the cable 136 and also serve to transmit forces both in tension and compression in a more effective manner than a bare cable. This, coupled with a pneumatic type vibrator, as hereinbefore discussed permits operation of a remote metal disintegration apparatus over longer distances than heretofore have been attempted, such as distances in excess of five feet.

The moving element assembly 132 can also be employed in a flexible sheath and therefore could be substituted for the control cable 26 in conjunction with the apparatus shown in FIGS. 1 and 2.

Figure 11:
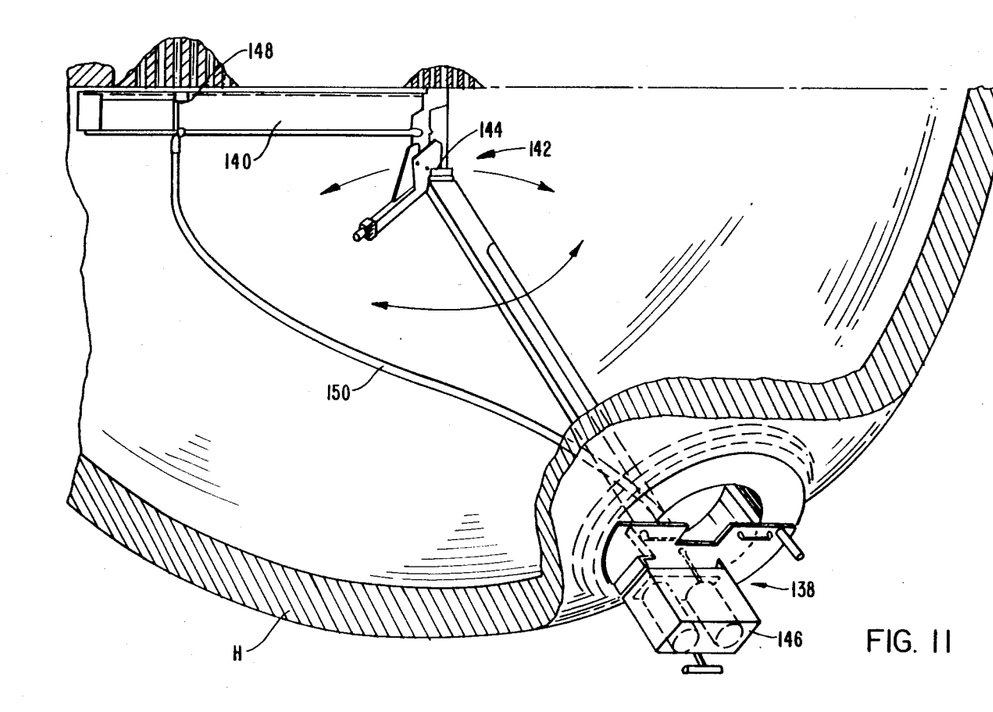
FIG. 11 is a pictorial representation of an apparatus incorporating the principles of the present invention for explosive or mechanical tube plug removal in a nuclear steam generator.

FIG. 11 illustrates an alternate embodiment of the present invention, a metal disintegration apparatus 138 mounted for use on a steam generator channel head H for explosive or mechanical tube plug remover. In this embodiment of the present invention, the electrode holder 140 is supported by an arm 142 that is configured so that it can rotate 360° around a pivot 144. A vibration feed assembly 146 is coupled to the electrode 148 by a control cable 150 similar to control cable 26 of FIGS. 1 and 2. What is to be realized is that variously configured articulated arms as shown or otherwise can be employed within the principles and scope of the invention. It is also possible to use robotic arms of conventional design to remotely position the electrode holder and therefore the electrode.

Figure 12:
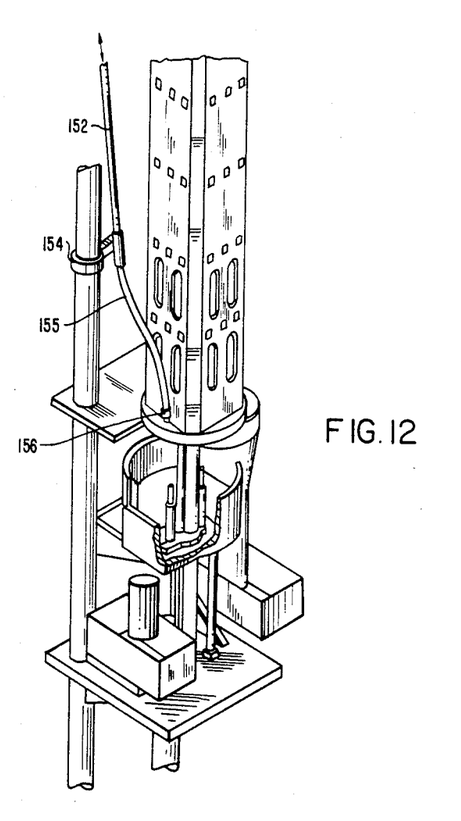
FIG. 12 is a fragmentary schematic view of an apparatus incorporating the principles of the present invention for control rod guide tube support replacement in a nuclear reactor vessel.

FIG. 12 illustrates still another embodiment of the present invention, a metal disintegration apparatus which includes a control cable 152. Here, the electrode is supported by a bracket type support 154 having a rigid projection 155 for supporting an electrode 156. The particular application illustrated is for pin replacement of control guide rod tube supports. Here, the desired operation must be performed under water in a flooded reactor cavity to minimize levels of radiation and only a device such as that taught by the present invention, which permits remote metal disintegration, can be employed. The support 154 and the rigid projection 155 therefrom here serve as an electrode holder.

From reviewing the disclosure pertaining to the alternate embodiments of the present invention it should be apparent that the subject invention can manifest itself in numerous configurations within the principles of the scope of the invention. It will be further understood that the various changes in the details, materials, arrangements of parts and operational conditions which have been herein described and illustrated in order to explain the nature of the invention may be made by those of ordinary skill in the art within the principles of the scope of the invention.

Having thus set forth the nature of the invention, what is claimed is:

1. A metal disintegration apparatus for performing work on a portion of a workpiece in a confined remote location comprising:

electrode means for disintegrating a portion of a workpiece upon operative engagement therewith;

electrode holder means for movably holding said electrode means relative to said portion of said workpiece;

positioning and supporting means secured on one end thereof to said electrode holder means, said supporting and positioning means being arrangable in a plurality of predetermined configurations for positioning said electrode holder means in a stationary selectable position and for supporting said electrode holder means at a confined remote location adjacent said workpiece, the other end of said positioning and supporting means being secured to a supporting surface remote to said electrode means;

vibration feed means arranged adjacent said supporting surface and having a mechanical output for vibrating at selected frequencies and for advancing selected distances, said vibration feed means being positioned remote to said electrode means; and actuator cable means for coupling said mechanical output to said electrode means, said actuator cable means extending through said electrode holder means and being secured on one end thereof to said electrode means, the other end of said actuator cable means being connected to said mechanical output of said vibration feed means, said actuator cable means vibrating and advancing said electrode means while said electrode holder means remains stationary at said selectable position secured on one end of said positioning and supporting means at said confined remote location adjacent said workpiece.

2. An apparatus in accordance with claim 1, wherein said positioning and supporting means comprises an articulated arm.

3. An apparatus in accordance with claim 2, wherein said articulated arm comprises a plurality of segments pivotably affixed together by locking pivotal joints.

4. An apparatus in accordance with claim 1, further comprising a fixture for mounting on a steam generator nozzle, said supporting surface being a steam generator nozzle, said other end of said positioning and supporting means being secured to said fixture.

5. An apparatus in accordance with claim 4, wherein said positioning and supporting means comprises an articulated arm.

6. An apparatus in accordance with claim 1, wherein said vibration feed means comprises a pneumatic oscillator to vibrate said mechanical output.

7. An apparatus in accordance with claim 6, wherein said pneumatic oscillator is of the air-cushioned reciprocating piston type.

8. An apparatus in accordance with claim 6, wherein said vibrator feed means further comprises a pneumatic cylinder for linear feed of said mechanical output.

9. An apparatus in accordance with claim 1, wherein said vibrator feed means comprises a pneumatic cylinder for linear feed of said mechanical output.

10. An apparatus in accordance with claim 1, wherein said vibrator feed means is positioned adjacent to said other end of said positioning and support means.

11. An apparatus in accordance with claim 1, wherein said actuator cable means comprises a flexible control cable of the frictionless type.

12. An apparatus in accordance with claim 11, wherein said flexible control cable comprises an outer flexible sheath, a pair of ball bearing trains being disposed within said sheath, said ball bearing trains movably sandwiching therebetween a flexible control bar, said flexible control bar being secured on one end thereof to said electrode means, the other end of said flexible control bar being secured to said mechanical output of said vibrator feed means.

13. An apparatus in accordance with claim 11, wherein flexible control cable comprises an outer flexible sheath, and a moving element assembly passing through said flexible sheath, said moving element assembly comprising a plurality of adjacent spherical shells disposed within said flexible sheath, said cable passing through each of said spherical shells so that said spherical shells are strung thereon, one end of said cable being secured to said electrode means, the other end of said cable being secured to said mechanical output of said vibration feed means.

14. An apparatus in accordance with claim 11, wherein said positioning and supporting means comprises an articulated arm, one end of said articulated arm being secured to said electrode holder, the other end of said artiuclated arm being secured to said supporting surface.

15. An apparatus in accordance with claim 1, further comprising at least a pair of spaced-apart guide rods slidably mounting said electrode means to said electrode holder means so as to direct movement of said electrode means relative to said electrode holder means along a preselected path, said guide rods slidingly received within said electrode holder means and having one end thereof secured to said electrode means, whereby the advancing of said electrode means by said vibration feed means causes a corresponding advancing of said guide rods relative to said electrode holder means.

16. An apparatus in accordance with claim 1, further comprising means for distributing coolant fluid to said electrode.

17. An apparatus in accordance with claim 15, wherein said electrode holder means further comprises bellow means secured thereto for containing said coolant fluid distributed to said electrode.

18. An apparatus in accordance with claim 1, wherein said electrode means has an elongated rectangular shape.

19. An apparatus in accordance with claim 1, further comprising power supply means coupled on one pole thereof to said electrode and on the other pole thereof to said workpiece.

20. An apparatus in accordance with claim 18, further comprising control panel means located remote from said electrode means, said control panel means including controls for controlling said power supply means and said vibration feed means, and instrumentation for monitoring the operation of said apparatus.

21. A metal disintegration apparatus for performing work on a portion of a workpiece in a confined remote location comprising:
electrode means for disintegrating a portion of a workpiece upon operative engagement therewith;
electrode holder means for movably holding said electrode means relative to said portion of said workpiece;
positioning and supporting means secured on one end thereof to said electrode holder means, said positioning and supporting means including a stationary rigid conduit for positioning said electrode holder means in a stationary preselected position at a confined remote location adjacent said workpiece and relative to a supporting surface, the other end of said positioning and supporting means being secured to said supporting surface remote to said electrode means;
vibration feed means arranged adjacent said supporting surface and having a mechanical output for vibrating at selected frequencies and for advancing selected distances, said vibration feed means being positioned remote to said electrode means; and
actuator cable means for coupling said mechanical output to said electrode means, said actuator cable means being disposed through said stationary rigid conduit, said actuator cable means extending through said electrode holder means and being secured on one end thereof to said electrode means, the other end of said actuator cable means being connected to said mechanical output of said vibration feed means, said actuator cable means being a moving element assembly including a plurality of adjacent spherical shells disposed within said rigid conduit, and a cable on which said spherical shells are strung, said actuator cable means vibrating and advancing said electrode means while said electrode holder means remains stationary at said preselected position secured on one end of said stationary rigid conduit at said confined remote location adjacent said workpiece.

22. An apparatus in accordance with claim 21, further comprising a fixture for mounting on a steam generator nozzle, said supporting surface being a steam generator nozzle, said other end of said positioning and supporting means being fixedly secured to said fixture.

23. An apparatus in accordance with claim 21, wherein said positioning and supporting means comprises an articulated arm.

24. An apparatus in accordance with claim 21, wherein said vibration feed means comprises a pneumatic oscillator to vibrate said mechanical output.

25. An apparatus in accordance with claim 24, wherein said pneumatic oscillator is of the air-cushioned reciprocating piston type.

26. An apparatus in accordance with claim 24, wherein said vibrator feed means further comprises a pneumatic cylinder for linear feed of said mechanical output.

27. An apparatus in accordance with claim 22, wherein said vibrator feed means comprises a pneumatic cylinder for linear feed of said mechanical output.

28. An apparatus in accordance with claim 22, further comprising at least a pair of spaced-apart guide rods slidably mounting said electrode means to said electrode holder means so as to direct movement of said electrode means relative to said electrode holder means along a preselected path, said guide rods slidingly received within said electrode holder means and having one end thereof secured to said electrode means, whereby the advancing of said electrode means by said vibration feed means causes a corresponding advancing of said guide rods relative to said electrode holder means.

29. An apparatus in accordance with claim 21, further comprising means for distributing coolant fluid to said electrode.

30. An apparatus in accordance with claim 29, wherein said electrode holder means further comprises bellow means secured thereto for containing said coolant fluid distributed to said electrode.

31. An apparatus in accordance with claim 21, wherein said electrode means has an elongated rectangular shape.

32. An apparatus in accordance with claim 21, further comprising power supply means coupled on one pole thereof to said electrode and on the other pole thereof to said workpiece.

33. An apparatus in accordance with claim 32, further comprising control panel means located remote from said electrode means, said control panel means including controls for controlling said power supply means and said vibration feed means, and instrumentation for monitoring the operation of said apparatus.

* * * * *